United States Patent
Luciani et al.

(10) Patent No.: US 6,614,791 B1
(45) Date of Patent: Sep. 2, 2003

(54) SYSTEM, DEVICE, AND METHOD FOR SUPPORTING VIRTUAL PRIVATE NETWORKS

(75) Inventors: James V. Luciani, Concord, MA (US); Matthew Squire, Raleigh, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/309,530

(22) Filed: May 11, 1999

(51) Int. Cl.[7] .......................... H04L 12/56; G06F 15/16
(52) U.S. Cl. .......................... 370/395.53; 370/395.54; 370/409; 370/410; 709/203; 709/249
(58) Field of Search .......................... 370/389, 392, 370/395.1, 395.5, 395.51, 395.53, 395.54, 400, 401, 409, 410, 522; 709/201, 203, 230, 238, 245, 249, 218, 224

(56) References Cited

U.S. PATENT DOCUMENTS

| | | | |
|---|---|---|---|
| 5,528,579 A | * 6/1996 | Wadman et al. | 370/15 |
| 5,638,365 A | * 6/1997 | Duault et al. | 370/395 |
| 5,684,800 A | * 11/1997 | Dobbins et al. | 370/401 |
| 5,946,308 A | * 8/1999 | Dobbins et al. | 370/392 |
| 5,974,452 A | * 10/1999 | Karapetkov et al. | 709/218 |
| 6,147,970 A | * 11/2000 | Troxel | 370/235 |
| 6,147,995 A | * 11/2000 | Dobbins et al. | 370/392 |
| 6,178,171 B1 | * 1/2001 | Alexander, Jr. et al. | 370/395 |
| 6,189,041 B1 | * 2/2001 | Cox et al. | 709/238 |
| 6,279,035 B1 | * 8/2001 | Brown et al. | 709/224 |
| 6,335,926 B1 | * 1/2002 | Silton et al. | 370/351 |
| 6,421,321 B1 | * 7/2002 | Sakagawa et al. | 370/238.1 |

OTHER PUBLICATIONS

The ATM Forum Technical Committee, Multi–Protocol Over ATM Version 1.0, Jul. 1997.
The ATM Forum Technical Committee, Multi–Protocol Over ATM Version 1.1, May 1999.
Luciani et al., Internet Engineering Task Force (IETF) Request for Comments (RFC) 2332, NBMA Next Hop Resolution Protocol (NHRP), Apr. 1998.
Fox and Petri, Internet Engineering Task Force (IETF) Internet Draft draft–ietf–ion–nhrp–vpn–00.txt, NHRP Support for Virtual Private Networks, Feb. 1999.

* cited by examiner

*Primary Examiner*—Alpus H. Hsu
(74) *Attorney, Agent, or Firm*—John C. Gorecki

(57) ABSTRACT

A system, device, and method for supporting multiple virtual private networks in an MPOA/NHRP communication network involves encoding a Virtual Private Network (VPN) identifier in certain MPOA/NHRP control messages in order to associate those MPOA/NHRP control messages with a particular VPN, and using an in-band signaling technique to add/remove VPNs to/from a connection. Packets from multiple VPNs are multiplexed over the connection. Each packet is associated with a particular VPN. If packets do not inherently include information from which the VPN can be ascertained, then a VPN identifier is encoded in the packet. The VPN identifier may be encoded in the packet via a tagging mechanism, in which each VPN is associated with a unique tag, and a tag is included in each packet. The VPN identifier may alternatively be encoded in the packet by including the VPN identifier in the packet, for example, in a header (such as an LLC/SNAP header) within the packet.

50 Claims, 9 Drawing Sheets

SYSTEM, DEVICE, AND METHOD FOR SUPPORTING VIRTUAL PRIVATE NETWORKS

CROSS-REFERENCE TO RELATED APPLICATION

The following commonly-owned United States patent application may be related to the subject patent application, and is hereby incorporated by reference in its entirety:

Application Ser. No. 09/257,075 entitled ESTABLISHING SHORTCUTS IN A MULTIPROTOCOL-OVER-ATM SYSTEM, filed in the names of Jim Mangin, Mohan Kalkunte, and Derek Pitcher on Feb. 24, 1999.

FIELD OF THE INVENTION

The present invention relates generally to communication systems, and more particularly to supporting virtual private networks in an MPOA/NHRP network.

BACKGROUND OF THE INVENTION

In today's information age, communication devices typically support a number of different protocols that enable the communication devices to communicate over a data communication network. These various protocols are typically organized in layers, such that the protocol at a particular layer of the protocol stack provides communication services to the higher layer protocols and receives communication services from the lower layer protocols.

In order for the data communication network to be efficient, the data communication network is often divided into subnetworks. Communication devices within the same subnetwork communicate over a Local Area Network (LAN) using a LAN protocol, such as Ethernet or Token Ring, at a medium access control (MAC) protocol layer of the protocol stack. Communication devices on different subnetworks communicate using an internetwork protocol, such as the Internet Protocol (IP), IPX, or Appletalk, that requires routing at the internetwork protocol layer of the protocol stack. For convenience, a communication device that provides routing functions at the internetwork protocol layer of the protocol stack is commonly referred to as a "router."

With the advent of Asynchronous Transfer Mode (ATM) networks, it was desirable to allow communication devices to be internetworked over the ATM network, and specifically over Virtual Channel Connections (VCCs) in the ATM network, in much the same was as those communication devices were internetworked over the LAN. Therefore, a LAN Emulation procedure was defined to allow such communication devices to be internetworked over the ATM network, and particularly over an emulated LAN (ELAN). The ELAN enabled those communication devices within the same subnetwork to communicate as if those communication devices were internetworked over the LAN.

Even though the ELAN enabled communication devices within the same subnetwork to communicate as if those communication devices were internetworked over the LAN, communication between communication devices on different subnetworks still required routing at the internetwork protocol layer of the protocol stack. Therefore, certain protocols were defined to allow communication devices on different subnetworks to communicate without requiring routing at the internetwork protocol layer of the protocol stack (or at least without requiring routing along the entire data path). One such protocol, known as Multi-Protocol Over ATM (MPOA), is described in ATM Forum Technical Committee documents entitled Multi-Protocol Over ATM Version 1.0 and Multi-Protocol Over ATM Version 1.1, which are hereby incorporated by reference in their entireties, and are referred to collectively hereinafter as the "MPOA specification". MPOA allows communication devices to communicate in an ELAN environment without requiring routing through the ELAN at the internetwork protocol layer of the protocol stack. Specifically, MPOA allows those communication devices at the edge of the ELAN to establish a shortcut VCC through the ATM network and forward the inter-subnetwork data traffic over the shortcut VCC rather than route the inter-subnetwork data traffic at the internetwork protocol layer of the protocol stack. One technique for establishing such a shortcut VCC, which uses MPOA in conjunction with the Next Hop Resolution Protocol (NHRP), is described in the related patent application entitled ESTABLISHING SHORTCUTS IN A MULTIPROTOCOL-OVER-ATM SYSTEM, which was incorporated by reference above.

For various reasons, it is sometimes necessary or desirable for a communication network to be shared by multiple consumers. Because each of the consumers typically needs to maintain a certain amount of autonomy, the communication network is divided into a number of Virtual Private Networks (VPNs), where each VPN emulates a single, private network.

The present invention relates to the support of Virtual Private Networks (VPNs) in an MPOA/NHRP network.

SUMMARY OF THE INVENTION

In accordance with one aspect of the invention, multiple Virtual Private Networks are supported in an MPOA/NHRP network. In-band signaling is used to add/remove Virtual Private Networks to/from a connection in the MPOA/NHRP network. In order to obtain the information that would permit a shortcut connection to be established, each MPOA client/server includes a Virtual Private Network identifier in each control message in order to associate each control message with its corresponding Virtual Private Network. Once the connection is established, in-band signaling is used to add a number of Virtual Private Networks to the connection. In-band signaling is also used to dynamically add or remove a Virtual Private Network from the connection.

In accordance with another aspect of the invention, packets from multiple Virtual Private Networks are multiplexed over the connection. Each packet is associated with a particular Virtual Private Network. If packets do not inherently include information that allows the Virtual Private Network to be identified for each packet, then a Virtual Private Network identifier is encoded into each packet.

In one embodiment, a tagging mechanism, such as the MPOA tagging mechanism, is used to encode the Virtual Private Network identifier into each packet. In such an embodiment, each Virtual Private Network is associated with a unique tag. In order to transmit a packet that is associated with a particular Virtual Private Network, the corresponding tag is determined, for example, from a cache lookup, and the tag is included in the packet, for example, by prepending the tag onto the packet.

In another embodiment, a Virtual Private Network identifier is included within a packet header, for example, within an LLC/SNAP header.

In accordance with yet another aspect of the invention, NHRP supports multiple Virtual Private Networks by encoding a Virtual Private Network identifier in each NHRP control message and in each packet. Each NHRP control message includes a VPN-ID Type-Length-Value (TLV) encoding including a VPN identifier. Each packet may include a VPN identifier, or else a tagging mechanism may be used.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
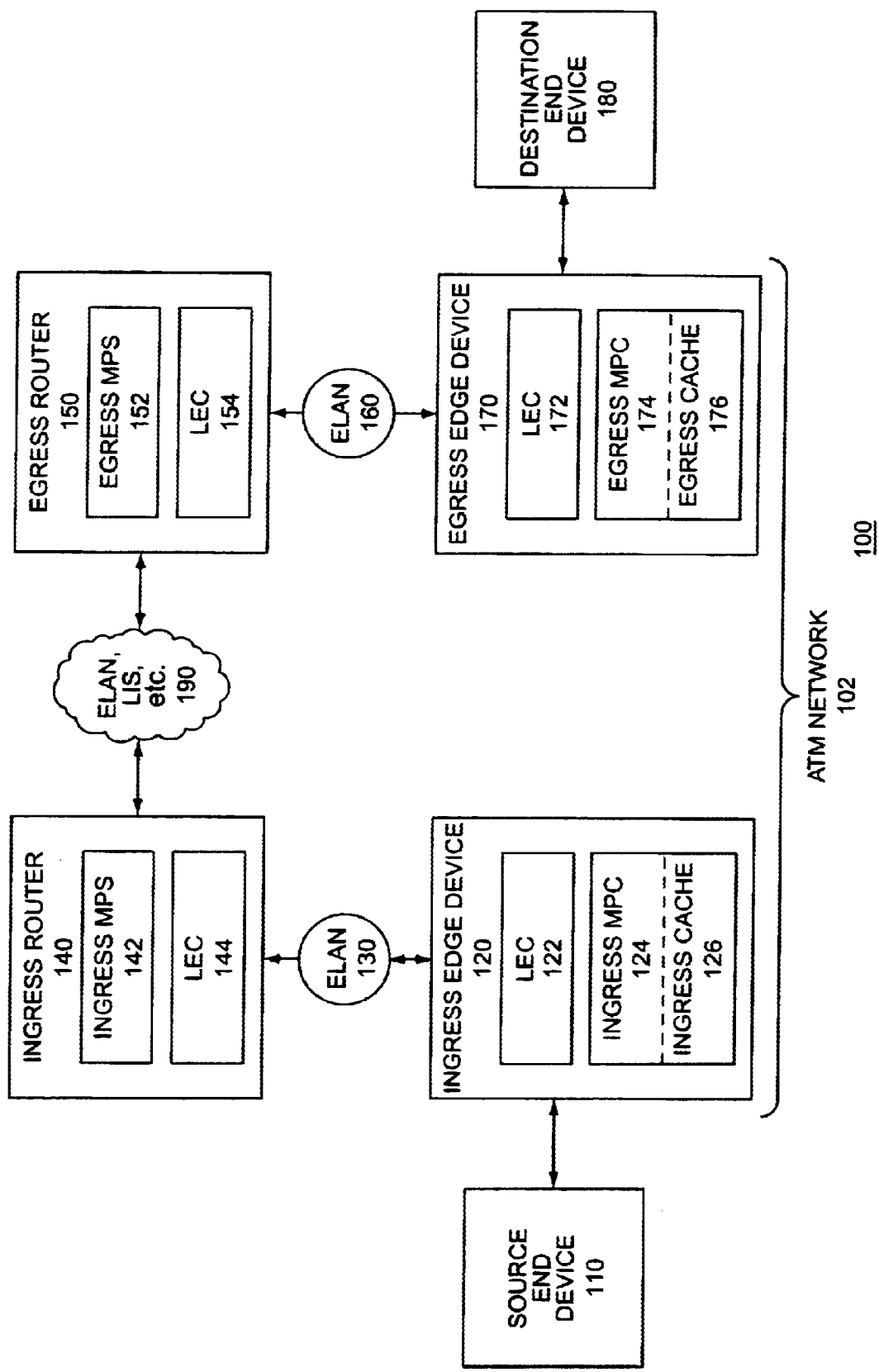
FIG. 1 is a block diagram showing an exemplary MPOA/NHRP system for enabling a Source End Device in one subnetwork to transmit packets of information to a Destination End Device in a different subnetwork over an ATM network.

FIG. 1 shows an exemplary MPOA/NHRP system 100 for enabling a Source End Device 1110 in one subnetwork to transmit packets of information to a Destination End Device 180 in a different subnetwork over an ATM network 102. The Source End Device 110 interfaces to the ATM Network 102 via an Ingress Edge Device 120, and specifically via a LAN port of the Ingress Edge Device 120. The Destination End Device 180 interfaces to the ATM Network 102 via an Egress Edge Device 170, and specifically via a LAN port of the Egress Edge Device 170. The Ingress Edge Device 120 and the Egress Edge Device 170 are internetworked through a number of ATM switches and routers, including, in this example, the Ingress Router 140 and the Egress Router 150. In this example, the Ingress Edge Device 120 is coupled to the Ingress Router 140 over a first Emulated LAN (ELAN) 130, and the Egress Edge Device 170 is coupled to the Egress Router 140 over an second ELAN 160. The Ingress Router 140 and the Egress Router 150 communicate over a communication system 190, which can be an ELAN, a Logical IP Subnetwork (LIS), or other communication system. It should be noted that the "ingress" and "egress" designations are relative to a particular flow. A particular device may be an "ingress" device for one flow and an "egress" device for another flow.

In order to support LAN emulation functions, each LAN emulation network device includes a LAN Emulation Client (LEC) for each ELAN it supports. LECs perform LAN emulation functions in accordance with the ATM Forum's LAN Emulation over ATM specification. Thus, the Ingress Edge Device includes a LEC 122 for interfacing with the ELAN 130, the Ingress Router 140 includes a LEC 144 for interfacing with ELAN 130, the Egress Router 150 includes a LEC 154 for interfacing with the ELAN 160, and the Egress Edge Device 170 includes a LEC 172 for interfacing with the ELAN 160.

In order to support MPOA functions, each MPOA network device includes MPOA protocol logic. The MPOA protocol is a client-server application. The MPOA protocol logic that implements the client functions of the MPOA protocol is referred to as an MPOA Client (MPC), and the MPOA protocol logic that implements the server functions of the MPOA protocol is referred to as an MPOA Server (MPS). The edge devices typically implement the MPOA client functions, and therefore the Ingress Edge Device 120 and the Egress Edge Device 170 include MPCs 124 and 174, respectively. For convenience, the MPC 124 is often referred to as an "ingress" MPC, and the MPC 174 is often referred to as an "egress" MPC. The routers typically implement the MPOA server functions, and therefore the Ingress Router 140 and the Egress Router 140 include MPSs 142 and 152, respectively. For convenience, the MPS 142 is often referred to as an "ingress" MPS, and the MPS 152 is often referred to as an "egress" MPS. Of course, an MPC, such as the MPC 124, communicates with an MPS, such as the MPS 142, using the MPOA protocol. However, two MPSs, such as the MPS 142 and the MPS 152, communicate using the Next Hop Resolution Protocol (NHRP) in order to complete MPOA transactions between two MPCs, such as the MPC 124 and the MPC 174.

It should be noted that an MPC and an MPS can be co-located within the same device. With reference to FIG. 1, it would be possible to combine the ingress functions of the Ingress Edge Device 120 and the Ingress Router 140 into a single ingress device that includes both the Ingress MPC 124 and the Ingress MPS 142. Likewise, it would be possible to combine the egress functions of the Egress Router 150 and the Egress Edge Device 170 into a single egress device that includes both the Egress MPS 152 and the Egress MPC 174.

In its role as ingress MPC, the MPC 124 provides a packet forwarding function within the MPOA system 100. Specifically, each packet received by the MPC 124 typically includes a source indicator, a destination indicator, and a protocol indicator. The MPC 124 selects an appropriate path based upon, among other things, the destination indicator in the received packet and forwards the packet to its destination over the selected path.

In accordance with the MPOA specification, there is always a default path from the MPC 124 to the MPC 174 over the LAN emulation connection between Ingress Edge Device 120 and the Egress Edge Device 170, and specifically between the LEC 122 and the LEC 172. Thus, the MPC 124 may forward the packet to the MPC 174 over the LAN emulation connection. Unfortunately, this default path is inefficient because packets must be routed from the Ingress Edge Device 120 to the Egress Edge Device 170, and specifically through a number of ATM switches and routers, including, in this example, the Ingress Router 140 and the Egress Router 150.

Figure 2:
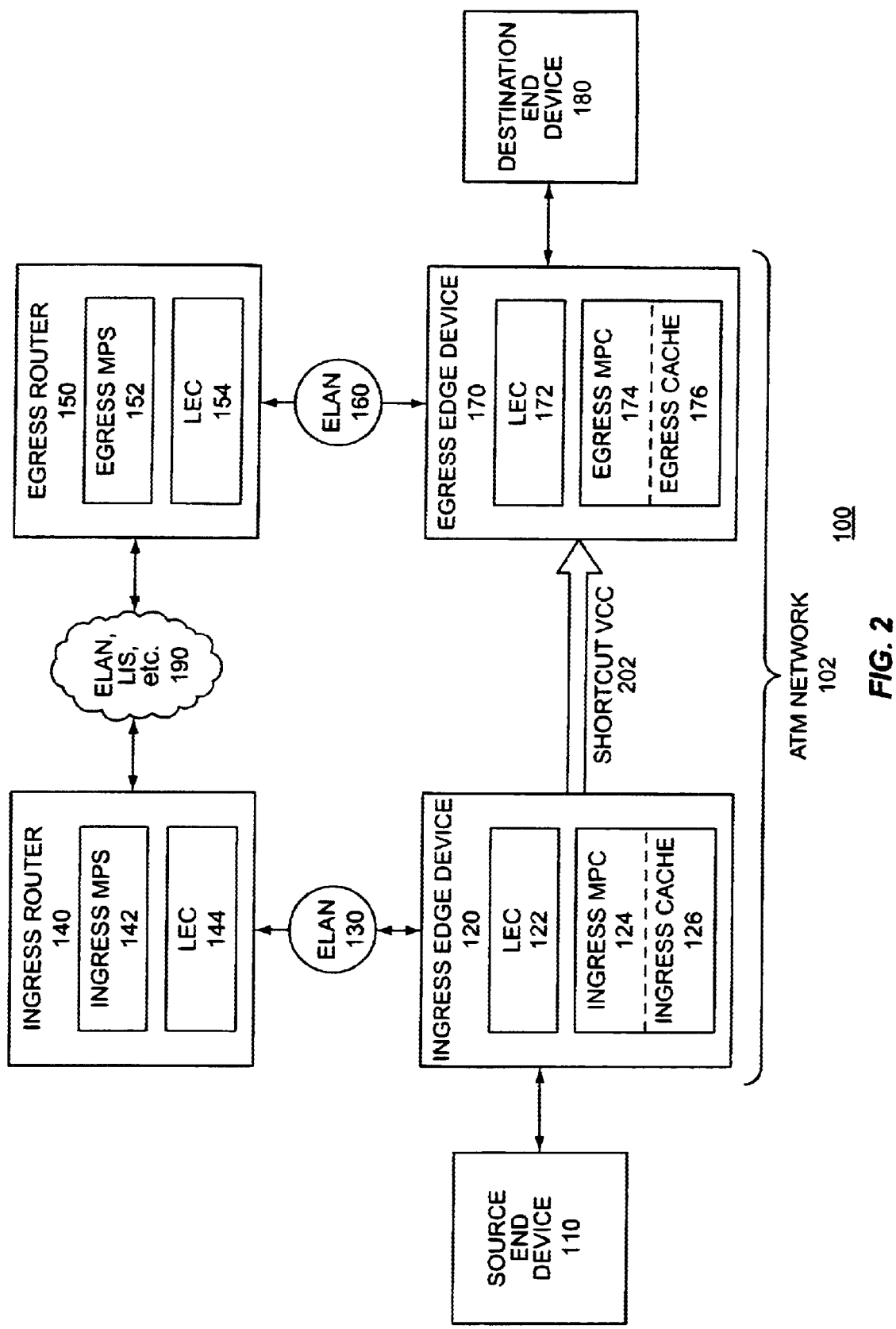
FIG. 2 is a block diagram showing the exemplary MPOA/NHRP system including a shortcut Virtual Channel Connection (VCC)

Therefore, rather than forwarding packets over the default path, it is preferable for the MPC 124 to establish a shortcut VCC 202 between the MPC 124 and the MPC 174 over the ATM Network 102, as shown in FIG. 2, and to forward packets over the shortcut VCC 202. The shortcut VCC 202 may be either a physical connection or a logical connection through a number of high-speed ATM switches. The MPC 124 establishes the shortcut VCC 202 based upon some predetermined criteria indicating that the shortcut VCC 202 is desirable. For example, in one prior art embodiment described in the related patent application entitled ESTABLISHING SHORTCUTS IN A MULTIPROTOCOL-OVER-ATM SYSTEM, which was incorporated by reference above, the MPC 124 establishes the shortcut VCC 202 based upon a packet flow rate and an MPS response time.

Figure 3:
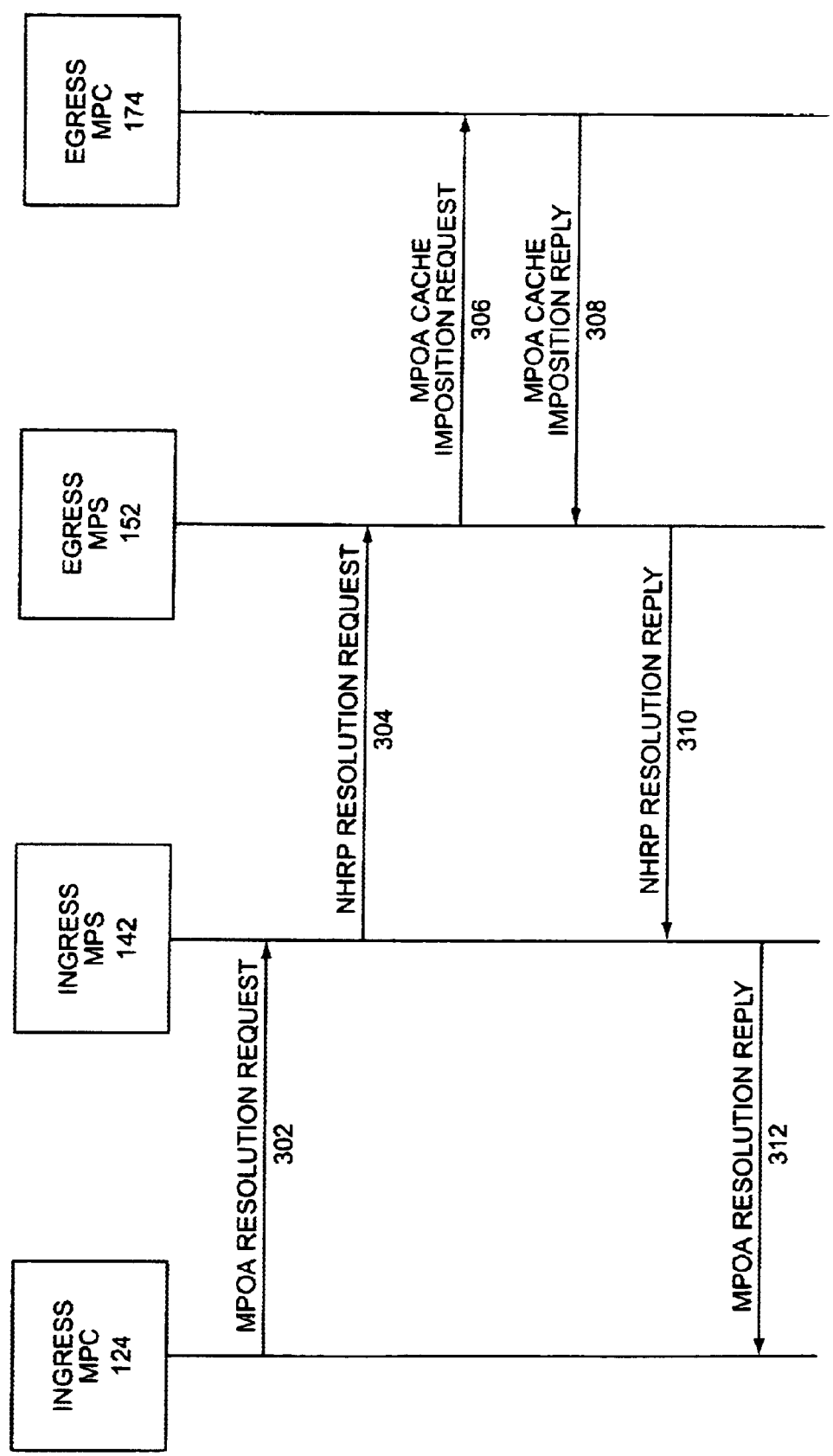
FIG. 3 is a message flow diagram showing an exemplary message flow for establishing the shortcut VCC in the MPOA/NHRP system.

In order for the Ingress MPC 124 to establish the shortcut VCC 202 to the Egress MPC 174, the Ingress MPC 124 first obtains the ATM address associated with the Egress MPC 174 using an MPOA control mechanism, and then establishes the shortcut VCC 202 by sending an ATM setup message addressed to the ATM address associated with the Egress MPC 174. FIG. 3 is a message flow diagram showing the messages exchanged between the various network devices in order for the Ingress MPC 124 to obtain the ATM address associated with the Egress MPC 174. The Ingress MPC 124 transmits an MPOA Resolution Request 302 to the Ingress MPS 142. The Ingress MPS 142 forwards the request for the ATM address to the Egress MPS 152 by transmitting an NHRP Resolution Request 304 to the Egress MPS 152. The Egress MPS 152 transmits an MPOA Cache Imposition Request 306 to the Egress MPC 174, and the Egress MPC 174 responds by transmitting an MPOA Cache Imposition Reply 308 to the Egress MPS 152. The Egress MPC 174 also updates the Egress Cache 176 to include, among other things, the Data Link Layer (DLL) encapsulation information for the shortcut VCC 202. Upon receiving the MPOA Cache Imposition Reply 308, the Egress MPS 152 transmits an NHRP Resolution Reply 310 to the Ingress MPS 142, which transmits an MPOA Resolution Reply 312 to the Ingress MPC 124 including, among other things, the ATM address associated with the Egress MPC 174. Upon receiving the MPOA Resolution Reply 312, the Ingress MPC 124 updates the Ingress Cache 126 to include, among other things, the ATM address of the Egress MPC to which a shortcut VCC should be established for this packet flow.

Once the shortcut VCC 202 is established, the Ingress MPC 124 forwards a packet to the Egress MPC 174 over the shortcut VCC 202 by adding a Logical Link Control (LLC) header onto the packet. The shortcut VCC 202 is more efficient than the default path because the shortcut VCC 202 provides a direct path between the Ingress MPC 124 and the Egress MPC 174 that bypasses the hop-by-hop processing of the default path. The shortcut VCC 202 typically remains active as long as packets are being forwarded over the shortcut VCC 202, and may be released after a predetermined period of inactivity in which no packets are forwarded over the shortcut VCC 202.

As described above, it is sometimes necessary or desirable for a communication network to be shared by multiple consumers. Therefore, the communication network may be divided into a number of Virtual Private Networks (VPNs), where each VPN emulates a single, private network. For the purpose of the present invention, each VPN is an independent routing domain.

Because each VPN is an independent routing domain, it is possible (and even likely) that the various VPNs will have overlapping address spaces. Thus, a particular address may be used in multiple VPNs, such that the particular address is ambiguous as to the VPN with which it is associated. When such an ambiguous address is included in a packet, for example, as the destination address in a packet, a packet processor is unable to determine the VPN for the ambiguous address.

Therefore, in order to resolve ambiguous addresses across VPNs having overlapping address spaces, each packet must be associated with a particular VPN. Each packet processor interprets the address(es) in the packet with respect to the particular VPN, thereby resolving any ambiguity from overlapping addresses.

Unfortunately, neither MPOA nor NHRP explicitly provide for supporting multiple VPNs over the MPOA/NHRP network. However, it is possible to support multiple VPNs over an MPOA/NHRP network.

One way to support multiple VPNs over an MPOA/NHRP network is to maintain a separate MPC for each VPN supported. Specifically, with reference again to FIG. 1, the Ingress Edge Device 120 would maintain an Ingress MPC for each VPN supported, and the Egress Edge Device 170 would maintain an Egress MPC for each VPN supported. This implies that there must be separate (control) addresses for each MPC pair.

A preferred way to support multiple VPNs over an MPOA/NHRP network is to have be each MPC support multiple VPNs. Unfortunately, the MPOA specification does explicitly provide for supporting multiple VPNs. Furthermore, since each VPN is considered to be independent, the VPNs may have overlapping address spaces, and therefore forwarding decisions must be based upon both a destination address and VPN for each packet.

One proposal for supporting multiple VPNs over an MPOA/NHRP network requires each MPOA client/server to encode a VPN identifier in each control frame that is sent to another MPOA client/server that supports multiple VPNs, and also requires a MPC to encapsulate each packet with a VPN header when the MPC multiplexes packets from multiple VPNs over a single connection. More specifically, each MPOA client/server that supports multiple VPNs (for example, the Ingress MPC 124, Ingress MPS 142, Egress MPS 152, and Egress MPC 174 in FIG. 3) includes a VPN-ID Type-Length-Value (TLV) encoding on all control frames that are sent to another MPOA client/server that supports multiple VPNs. The VPN-ID TLV encoding identifies the VPN (routing domain) for the internetwork addresses contained in the control frame. Thus, with reference to FIG. 3, the Ingress MPC 124 includes a VPN-ID TLV encoding in the MPOA Resolution Request 302, the Ingress MPS 142 includes the VPN-ID TLV encoding in the NHRP Resolution Request 304, and the Egress MPS 152 includes the VPN-ID TLV encoding in the MPOA Cache Imposition Request 306. Likewise, the Egress MPC 174 includes the VPN-ID TLV encoding in the MPOA Cache Imposition Reply 308, the Egress MPS 152 includes the VPN-ID TLV encoding in the NHRP Resolution Reply 310, and the Ingress MPS 142 includes the VPN-ID TLV encoding in the MPOA Resolution Reply.

Furthermore, when an MPC that supports multiple VPNs, such as the Ingress MPC 124, establishes a connection to another MPC that supports multiple VPNs, that MPC can designate the connection to a single VPN or to all VPNs. In order to designate the connection to a single VPN, the MPC includes the VPN identifier within the connection setup message, preferably within an Information Element (IE) such as the Generic Identifier Transport (GIT) Information Element (IE). In order to designate the connection to all VPNs, the MPC omits the VPN identifier from the connection setup message (for example, by omitting the IE from the connection setup message), and instead encapsulates all packets that are sent over the connection with a VPN header that identifies the VPN for the packet. It should be noted that no encapsulation is needed when the connection is designated to a single VPN, since all packets transported over the connection belong to the designated VPN.

This proposal has a number of drawbacks that make it an other than optimal solution for supporting multiple VPNs in a MPOA network.

First, there is no assurance that the GIT IE (or other IE) will be propagated from the originating MPC to the destination MPC. The GIT IE is defined in the ATM User-Network Interface Specification (UNI) 4.0, and therefore switches that run earlier versions of UNI (specifically, UNI 3.0 and UNI 3.1) will not recognize the GIT IE and will most likely drop the GIT IE. Furthermore, intermediate switches that run UNI 4.0 (or later UNI versions) are not required to forward the GIT IE, and therefore even those switches may drop the GIT IE. This is particularly likely in public switches, which often implement some screening or filtering of IEs so that undesirable IEs do not cause problems in the network.

Second, a connection that is designated to a particular VPN cannot be redesignated to another VPN. In accordance with the proposal, designation of a connection to a particular VPN is fixed for the lifetime of the connection.

Third, a connection cannot be designated to a particular group of VPNs. In accordance with the proposal, a connection can be designated to either one VPN or all VPNs, but not to a particular group of VPNs.

Fourth, the use of additional encapsulations to multiplex packets from different VPNs over a single connection is unnecessarily complex. Specifically, encapsulation increases the packet size, which therefore consumes additional connection bandwidth. Also, encapsulation requires that the MPOA devices be updated to support the encapsulation scheme. Furthermore, encapsulation requires extra processing, both by the, originating MPC and by the destination MPC.

A preferred embodiment of the present invention still requires each MPOA client/server to encode a VPN identifier in each control frame that is sent to another MPOA client/server that supports multiple VPNs, but overcomes the other drawbacks by using an in-band signaling technique to designate the connection to one or more VPNs and eliminating the need for additional VPN encapsulation when multiplexing packets from multiple VPNs over a single connection.

More specifically, each MPOA client/server that supports multiple VPNs (for example, the Ingress MPC 124, Ingress MPS 142, Egress MPS 152, and Egress MPC 174 in FIG. 3) encodes a VPN identifier in all control frames that are sent to another MPOA client/server that supports multiple VPNs. The VPN identifier is preferably encoded within a packet header, such as an LLC/SNAP header, although the VPN identifier may alternatively be included in the packet using a TLV encoding or other means. Because each control frame traverses a single "hop" on the communication path, each VPN identifier is applicable to a single "hop" only. Therefore, a VPN identifier may be added or removed at any "hop" along the communication path. In order to provide end-to-end VPN signaling across the entire communication path, the VPN identifier must be replicated or otherwise inserted at each "hop" along the communication path. For example, with reference to FIG. 3, the Ingress MPC 124 includes a VPN identifier in the MPOA Resolution Request 302, the Ingress MPS 142 replicates the VPN identifier in the NHRP Resolution Request 304, and the Egress MPS 152 replicates the VPN identifier in the MPOA Cache Imposition Request 306. Likewise, the Egress MPC 174 includes the VPN identifier in the MPOA Cache Imposition Reply 308, the Egress MPS 152 replicates the VPN identifier in the NHRP Resolution Reply 310, and the Ingress MPS 142 replicates the VPN identifier in the MPOA Resolution Reply.

In order to designate a connection to one or more VPNs, the Ingress MPC 124 establishes the connection in accordance with the MPOA specification, and subsequently sends one or more in-band messages over the connection to add/remove VPNs to/from the connection. Each in-band message indicates a particular VPN, and also indicates whether to add the VPN to the connection or remove the VPN from the connection. The use of in-band signaling (for example, as opposed to including a VPN identifier in the GIT IE within the connection setup message) allows VPN signaling to be accomplished regardless of the switching network, and also allows individual VPNs to be dynamically added to, or removed from, the connection. This latter feature allows the connection to support a group of VPNs without supporting all VPNs.

In order to multiplex packets from multiple VPNs over a single connection without using VPN encapsulation, the VPN for each packet is implied by the MPOA egress cache tag that is prepended onto each packet sent over the connection. MPOA defines an encapsulation mechanism by which the Egress MPC 174 can assign a tag that is prepended by the Ingress MPC 124 onto all of the packets for a particular flow. The MPOA specification defines the use of tags as part of a tagged encapsulation technique. Specifically, when the Egress MPC 174 receives an MPOA Cache Imposition Request 306 including a VPN identifier, the Egress MPC 174 assigns a unique tag for that flow within the specified VPN and creates a corresponding egress cache entry that, among other things, maps the tag to the VPN identifier. Upon receiving the tag from the Egress MPC 174, the Ingress MPC 124 creates a corresponding ingress cache entry that, among other things, maps the flow and its VPN identifier to the tag. When the Ingress MPC 124 receives a packet for a particular flow in a particular VPN, the Ingress MPC 124 finds the ingress cache entry associated with the particular VPN, retrieves the tag from the ingress cache entry, encapsulates the packet using the tag, and sends the encapsulated packet to the Egress MPC 174 over the connection. When the Egress MPC 174 receives the encapsulated packet from the Ingress MPC 124, the Egress MPC 174 finds the egress cache entry associated with the received tag and retrieves the VPN identifier from the egress cache entry. In this way, the Egress MPC 174 is able to obtain the VPN identifier for each packet without using VPN encapsulation in addition to the tagged encapsulation.

Figure 4:
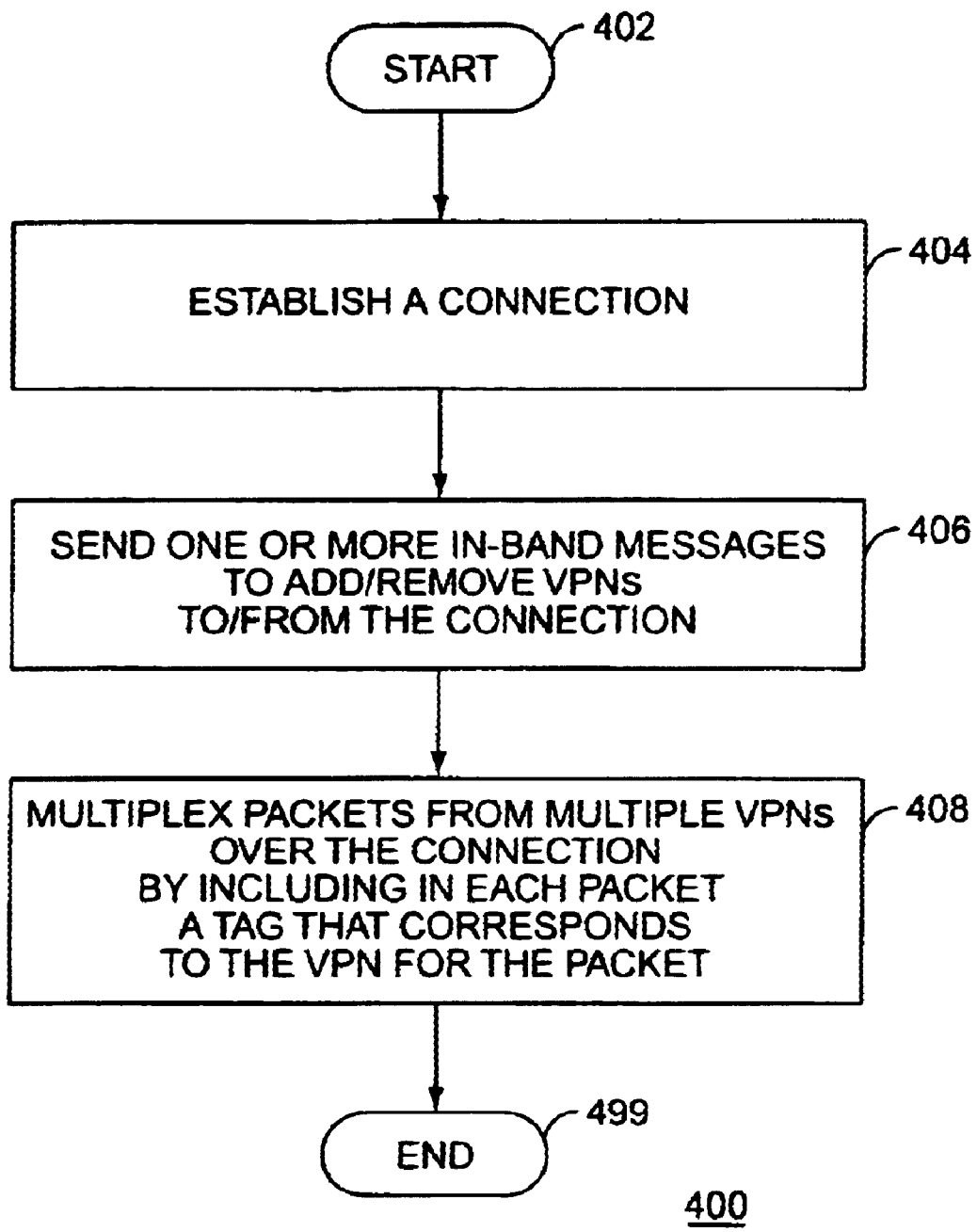
FIG. 4 is a logic flow diagram showing exemplary logic for supporting multiple VPNs in the MPOA/NHRP system in accordance with a preferred embodiment of the present invention.

Thus, in order to support multiple VPNs over the MPOA/NHRP network, the Ingress MPC 124 performs the logic 400 shown in FIG. 4. The logic begins in step 402, and proceeds to establish a connection, in step 404. After the connection is established in step 404, the logic sends one or more in-band messages in order to add/remove VPNs to/from the connection, in step 406, and multiplexes packets from multiple VPNs over the connection by including in each packet a tag that corresponds to the VPN for the packet, in step 408. It should be noted that the logic can send additional in-band messages at any time after the connection is established. The logic terminates in step 499.

Figure 5:
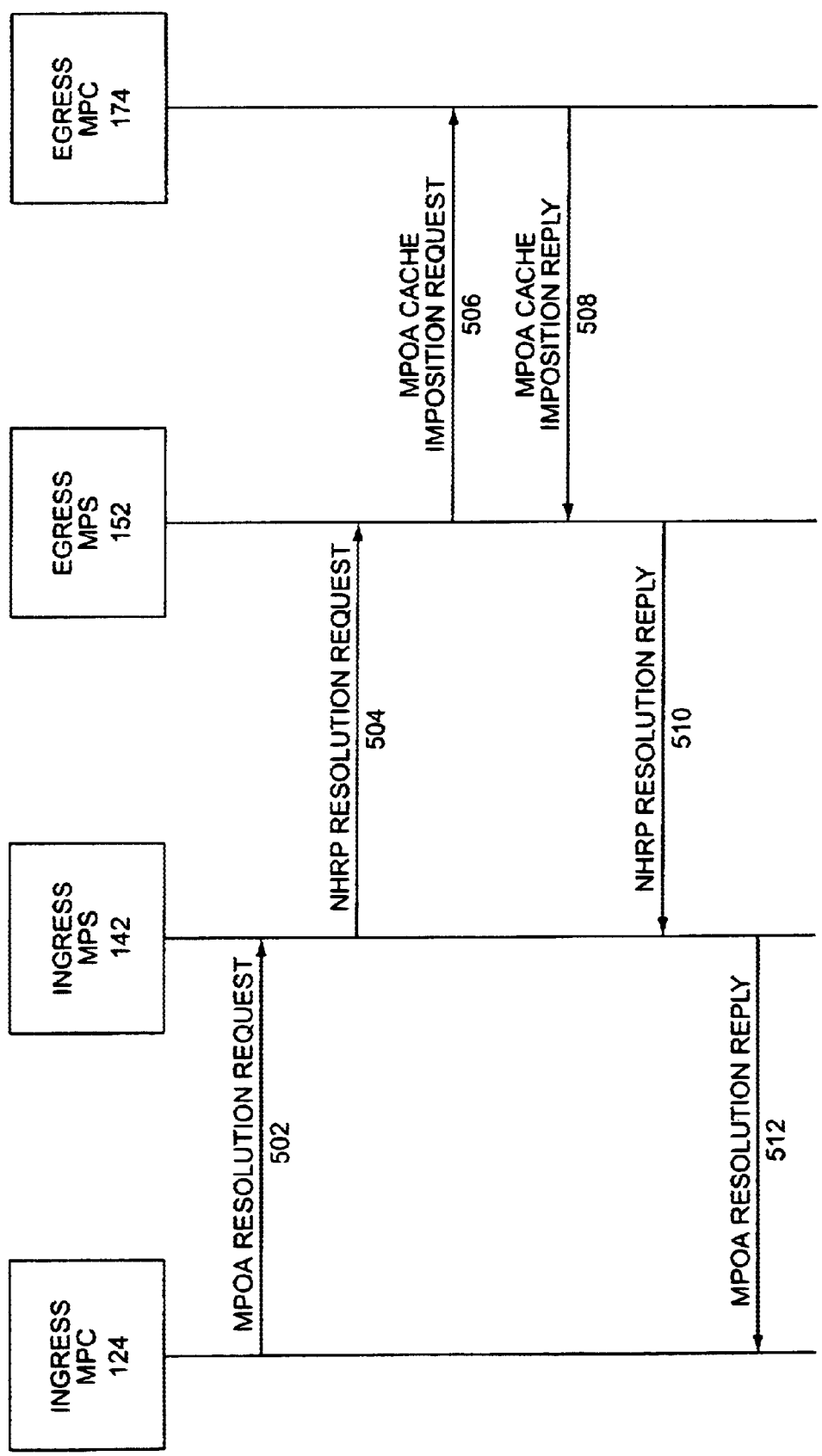
FIG. 5 is a message flow diagram showing an exemplary message flow for establishing a connection in an MPOA/NHRP system supporting multiple VPNs in accordance with a preferred embodiment of the present invention.

FIG. 5 is a message flow diagram showing the messages exchanged between the various network devices in order for the Ingress MPC 124 to obtain the ATM address associated with the Egress MPC 174 in accordance with a preferred embodiment of the present invention. The Ingress MPC 124 transmits an MPOA Resolution Request 502 including a VPN identifier to the Ingress MPS 142. The Ingress MPS 142 forwards the request for the ATM address to the Egress MPS 152 by transmitting an NHRP Resolution Request 504 including a VPN identifier to the Egress MPS 152. The Egress MPS 152 transmits an MPOA Cache Imposition Request 506 including a VPN identifier to the Egress MPC 174. The Egress MPC 174 allocates a unique tag for the flow and VPN identified by the VPN identifier in the MPOA Cache Imposition Request 506, creates an egress cache entry that maps the tag to the VPN identifier, and transmits an MPOA Cache Imposition Reply 508 to the Egress MPS 152 including the ATM address associated with the Egress MPC 174, a VPN identifier, and the tag. Upon receiving the MPOA Cache Imposition Reply 508, the Egress MPS 152 transmits an NHRP Resolution Reply 510 to the Ingress MPS 142 including the ATM address, a VPN identifier, and the tag. The Ingress MPS 142 transmits an MPOA Resolution Reply 512 to the Ingress MPC 124 including the ATM address associated with the Egress MPC 174, a VPN identifier, and the tag. Upon receiving the MPOA Resolution Reply 512, the Ingress MPC 124 creates an ingress cache entry mapping the ATM address to the VPN identifier and to the tag.

Figure 6A:
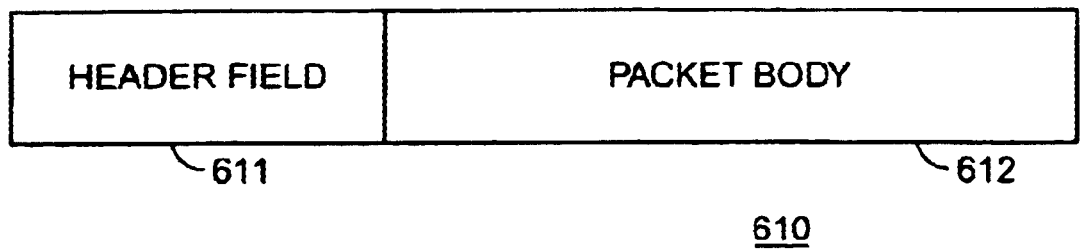
FIG. 6A is a block diagram showing the format of a packet including a header field having encoded therein a VPN identifier in accordance with a preferred embodiment of the present invention.

FIG. 6A is a block diagram showing the format of an exemplary packet 610 including a header field 611, such as an LLC/SNAP header, and a packet body 612. The VPN identifier is encoded within the header field 611.

Figure 6B:
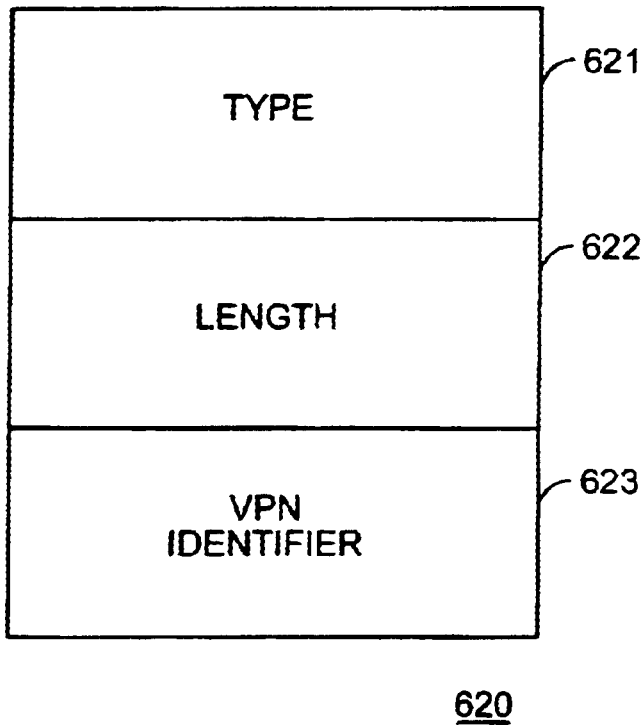
FIG. 6B is a block diagram showing the format of a VPN-ID Type-Length-Value (TLV) encoding in accordance with an alternate embodiment of the present invention.

FIG. 6B is a block diagram showing the format of a preferred VPN-ID TLV encoding 620 that is included in each MPOA/NHRP control message for supporting multiple VPNs. The VPN-ID TLV encoding 620 includes a type field 621 identifying the VPN-ID TLV encoding, a length field 622, and a VPN identifier field 623 including a VPN identifier for identifying the VPN.

Figure 7:
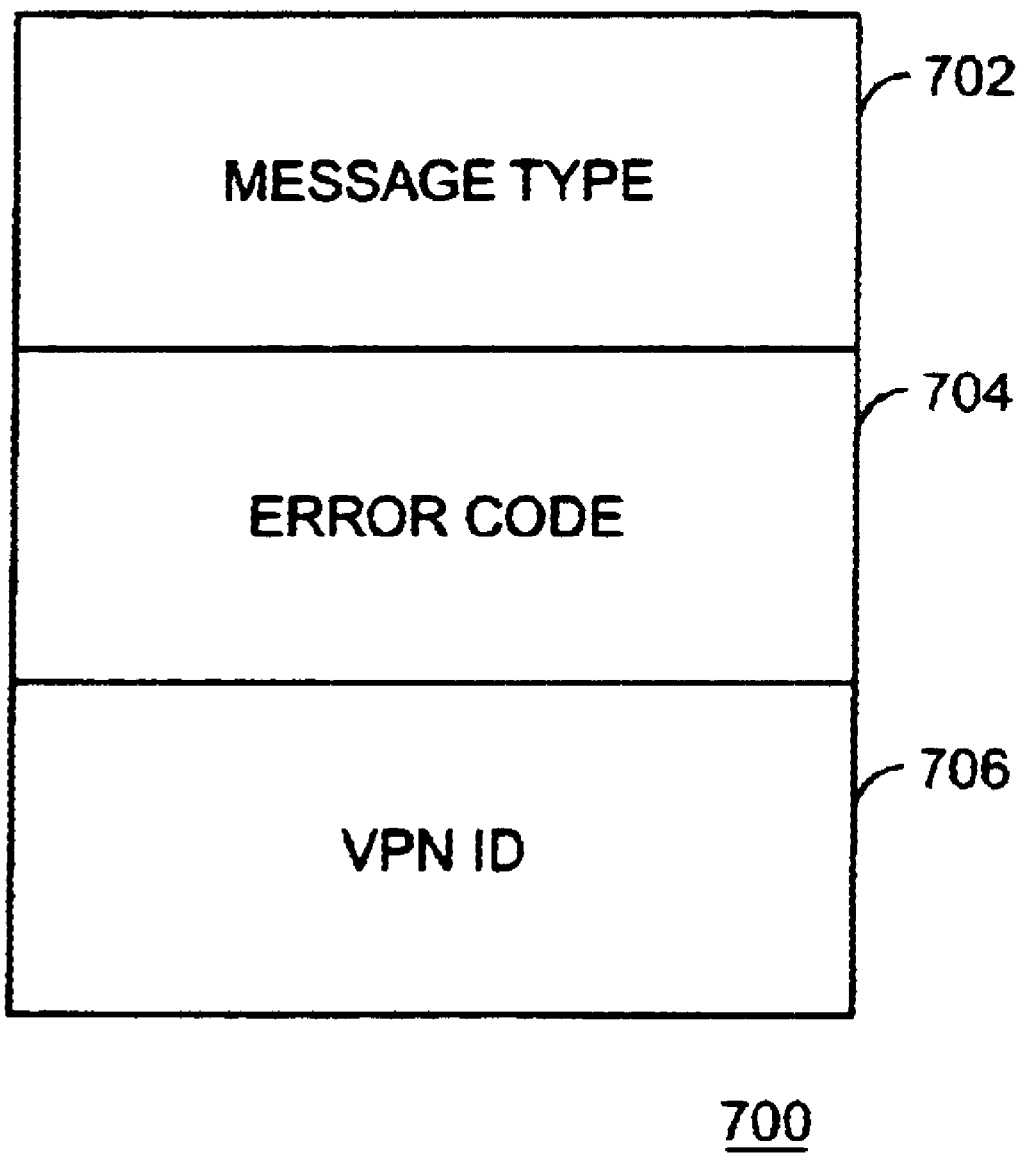
FIG. 7 is a block diagram showing the format of an in-band message for adding/removing VPNs to/from the connection in accordance with a preferred embodiment of the present invention.

As described above, once the Ingress MPC 124 has obtained the ATM address of the Egress MPC 174, the Ingress MPC 124 establishes a connection using a well-known connection setup message. Thereafter, the Ingress MPC 124 sends one or more in-band messages to the Egress MPC 174 over the connection in order to add/remove VPNs to/from the connection. As shown in FIG. 7, an exemplary in-band signaling message 700 typically includes, among other things, a Message Type field 702, an Error Code field 704, and a VPN ID field 706. In an exemplary embodiment of the present invention, the Message Type field 702 indicates one of four (4) different message types, specifically an Add VPN Request message, an Add VPN Reply message, a Delete VPN Request message, and a Delete VPN Reply message. The Error Code field 704 indicates whether the add/delete operation for a particular message was completed successfully or was not completed because access was denied or the VPN identifier was unknown. The VPN ID field 706 carries the VPN identifier.

In order to forward a packet over the connection for a particular VPN, the Ingress MPC 124 encapsulates the packet using the unique tag associated with the particular VPN. Specifically, upon receiving the packet associated with the particular VPN, the Ingress MPC 124 finds the ingress cache entry associated with the particular VPN, and retrieves the tag from the ingress cache entry. The Ingress MPC 124 then encapsulates the packet using the retrieved tag, and sends the encapsulated packet to the Egress MPC 174 over the connection.

Figure 8:
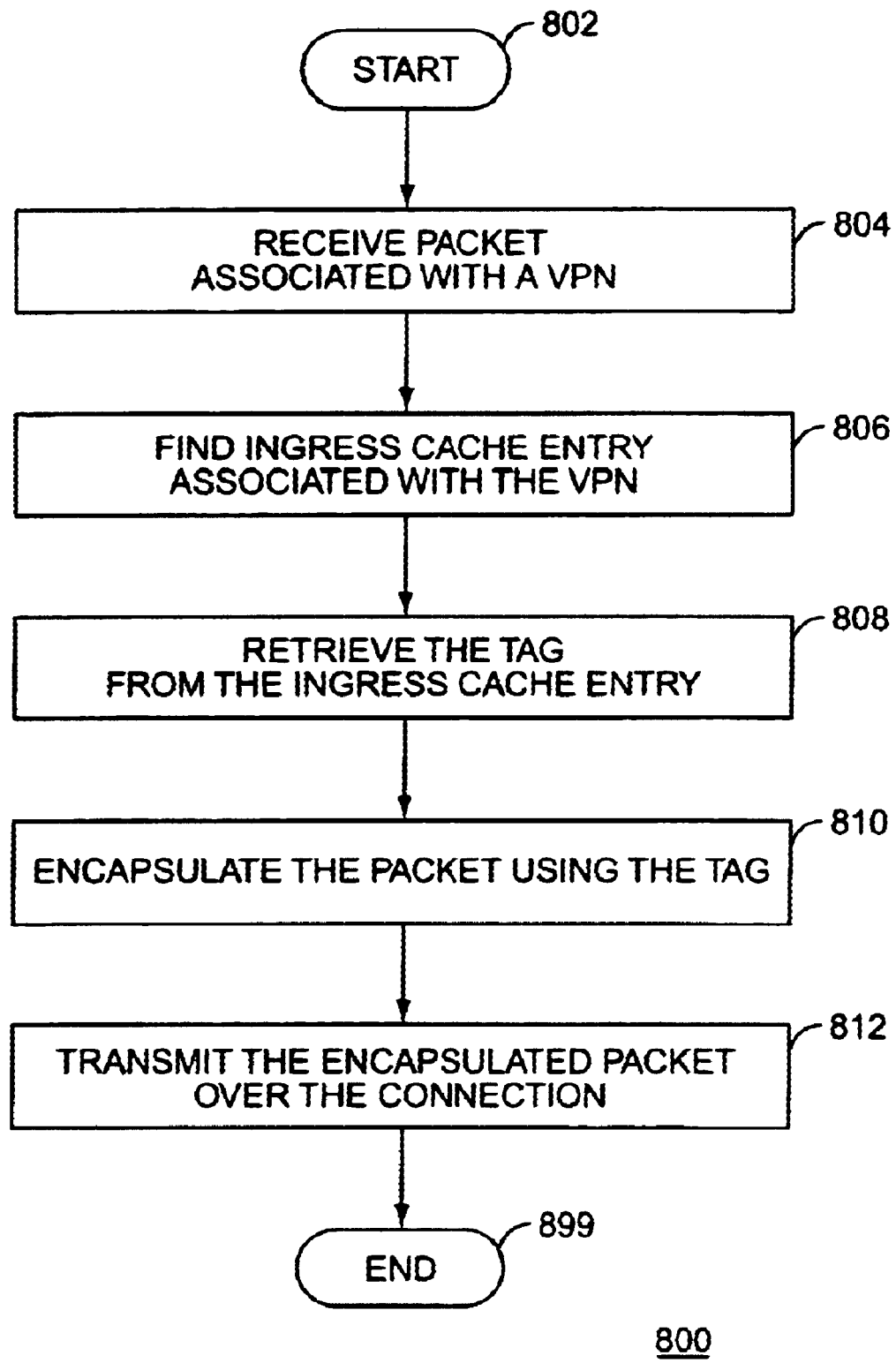
FIG. 8 is a logic flow diagram showing exemplary logic for multiplexing packets from multiple VPNs over the connection in accordance with a preferred embodiment of the present invention.

FIG. 8 is a logic flow diagram showing exemplary Ingress MPC logic 800 for multiplexing packets from multiple VPNs over the connection. The logic begins in step 802, and upon receiving a packet associated with a VPN, in step 804, finds an ingress cache entry associated with the VPN, in step 806. The logic then retrieves the tag from the ingress cache entry, in step 808, and encapsulates the packet using the tag, in step 810. The logic transmits the encapsulated packet over the connection, in step 812, and terminates in step 899.

Upon receiving the encapsulated packet from the Ingress MPC 124 over the connection the Egress MPC 174 determines the VPN for the packet by finding the egress cache entry associated with the tag and retrieving the VPN identifier from the egress cache entry.

Figure 9:
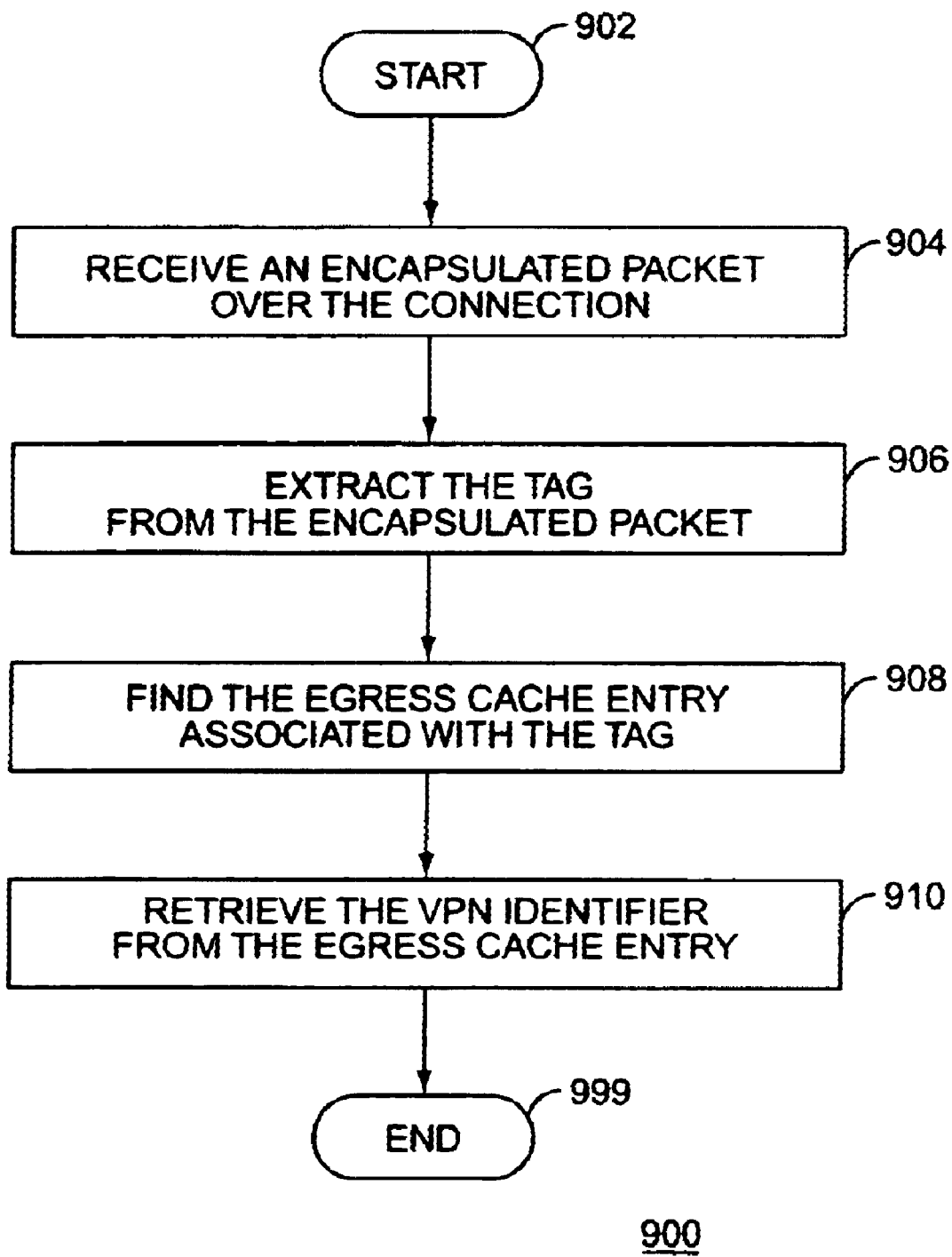
FIG. 9 is a logic flow diagram showing exemplary logic for decoding packets from multiple VPNs received over the connection in accordance with a preferred embodiment of the present invention.

FIG. 9 is a logic flow diagram showing exemplary Egress MPC logic 900 for multiplexing packets from multiple VPNs over the connection. The logic begins in step 902, and upon receiving an encapsulated packet over the connection, in step 904, extracts the tag from the encapsulated packet, in step 906. The logic then finds the egress cache entry associated with the tag, in step 908, and retrieves the VPN identifier from the egress cache entry, in step 910. The logic terminates in step 999.

In a preferred embodiment of the present invention, an MPOA client/server includes the VPN identifier in certain MPOA/NHRP control messages within a header field, such as an LLC/SNAP header. In an alternative embodiment of the present invention, an MPOA client/server includes the VPN identifier in certain MPOA/NHRP messages within a VPN-ID TLV encoding that is included in the packet. However, the present invention is in no way limited to using a header or a VPN-ID TLV encoding to convey the VPN identifier in MPOA/NHRP control messages. Other embodiments, such as including the VPN identifier in a different TLV encoding within the MPOA/NHRP control messages or by other means, will become apparent to a skilled artisan.

In a preferred embodiment of the present invention, a tagging mechanism is used to implicitly indicate a VPN for each packet. However, the present invention is in no way limited to using a tagging mechanism to indicate a VPN for each packet. In an alternative embodiment of the present invention, the Egress MPC 174 may be able to determine the VPN for each packet based upon inherent information contained in the packet, in which case packets from multiple VPNs can be multiplexed over the connection without using VPN encapsulation or tagged encapsulation.

In certain situations, it is desirable for NHRP alone to support multiple VPNs. Thus, in one embodiment of the present invention, NHRP is modified or otherwise redefined to support multiple VPNs by including a VPN identifier in certain NHRP control messages, for example, by including the VPN identifier in a VPN-ID TLV encoding or LLC/SNAP header, and encoding a VPN identifier in each packet, for example, using a tagging scheme like the MPOA tagging scheme or including the VPN identifier in an LLC/SNAP header.

In a preferred embodiment of the present invention, predominantly all of the MPOA client/server logic for supporting multiple VPNs and multiplexing packets from multiple VPNs over a connection (including the logic 400 for supporting multiple VPNs shown in FIG. 4, the logic for including the VPN-ID TLV encoding in each control message as shown in FIG. 5, the logic 800 for multiplexing packets from multiple VPNs over the connection as shown in FIG. 8, and the logic 900 for decoding packets from multiple VPNs received over the connection as shown in FIG. 9) is implemented as a set of computer program instructions that are stored in a computer readable medium and executed by an embedded microprocessor system within the MPOA/NHRP device, and particularly within an MPOA edge device (e.g., the Ingress Edge Device 120 and Egress Edge Device 170) or router (e.g., Ingress Router 140 and Egress Router 150). Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for supporting multiple VPNs in an MPOA/NHRP communication system, involving establishing a connection in the communication system and using in-band signaling to designate the connection for a number of Virtual Private Networks. In-band signaling is used to add a VPN to the connection or to remove a VPN from the connection. The method further involves multiplexing packets from the multiple VPNs over the connection, which can be done by encoding a VPN identifier in each packet using a tagging mechanism, a header that includes the VPN identifier (such as an LLC/SNAP header), or other means.

The present invention may also be embodied as an apparatus for supporting multiple VPNs in an MPOA/NHRP communication system, where the apparatus includes connection establishment logic for establishing a connection over the MPOA/NHRP communication system, in-band signaling logic for designating the connection for a number of Virtual Private Networks, and multiplexing logic for multiplexing packets from the number of Virtual Private Networks over the connection.

In one type of apparatus, the in-band signaling logic sends in-band signals to add/remove a VPN to/from the connection, specifically by including in each in-band signal a VPN identifier identifying the VPN to be added/removed to/from the connection. The multiplexing logic encodes a VPN identifier in each packet. The apparatus may include a database for mapping each VPN to a unique tag corresponding to the VPN, in which case the multiplexing logic, upon receiving a packet, retrieves the tag corresponding to the Virtual Private Network from the database and inserts the tag into the packet. The apparatus may alternatively include the VPN identifier in the packet, for example, by including the VPN identifier in a header (such as an LLC/SNAP header) within each packet.

In another type of apparatus, the in-band signaling logic receives in-band signals to add/remove a VPN to/from the connection. The multiplexing logic receives packets over the connection and determines a VPN for each packet. The multiplexing logic may determine the VPN for each packet based upon inherent information within each packet, or else may determine the VPN for each packet based upon a VPN identifier encoded in each packet. When a VPN identifier is encoded in each packet, the apparatus may include a database for mapping each of a plurality of tags to a corresponding VPN identifier, in which case the multiplexing logic, upon receiving a packet including a tag, retrieves the VPN identifier from the database based upon the tag. Alternatively, each packet may include a VPN identifier, for example in a header (such as an LLC/SNAP header) within each packet, in which case the multiplexing logic extracts the VPN identifier from the packet.

The present invention may further be embodied as a computer program product comprising a computer readable medium having embodied therein a computer program for supporting multiple Virtual Private Networks in an MPOA/NHRP communication system, wherein the computer program includes connection establishment logic programmed to establish a connection over the MPOA/NHRP communication system, in-band signaling logic programmed to use in-band signals to designate the connection for a number of Virtual Private Networks, and multiplexing logic programmed to multiplex packets from the number of Virtual Private Networks over the connection.

In one computer program product embodiment, the in-band signaling logic is programmed to send an in-band signal including a Virtual Private Network identifier identifying a Virtual Private Network to be added to the connection and to send an in-band signal including a Virtual Private Network identifier identifying a Virtual Private Network to be removed from the connection. The multiplexing logic is programmed to encode a VPN identifier in each packet. The multiplexing logic may interface to a database mapping each VPN to a unique tag corresponding to the VPN, in which case the multiplexing logic, upon receiving a packet associated with a particular VPN, retrieves the tag corresponding to the Virtual Private Network from the database and inserts the tag into the packet. The multiplexing logic may alternatively include the VPN identifier in the packet, for example, by including the VPN identifier in a header (such as an LLC/SNAP header) within each packet.

In another computer program product embodiment, the in-band signaling logic is programmed to receive an in-band signal including a VPN identifier identifying a VPN to be added to the connection and to receive an in-band signal including a VPN identifier identifying a VPN to be removed from the connection. The multiplexing logic is programmed to receive the packets over the connection and determine a VPN for each packet. The multiplexing logic may determine the VPN for each packet based upon inherent information within each packet, or alternatively may determine the VPN for each packet based upon a VPN identifier encoded in each packet. In this latter case, the multiplexing logic may interface with a database mapping each of a plurality of tags to a corresponding VPN identifier, in which case the multiplexing logic, upon receiving a packet including a tag, retrieves the VPN identifier from the database based upon the tag. Alternatively, each packet may include a VPN identifier, for example, in a header (such as an LLC/SNAP header), in which case the multiplexing logic extracts the Virtual Private Network identifier from the packet.

The present invention may also be embodied as a communication system for supporting multiple Virtual Private Networks, the communication system comprising an ingress MPOA client in communication with an egress MPOA client over an MPOA/NHRP network, wherein the ingress MPOA client establishes a connection to the egress MPOA client over the MPOA/NHRP network, sends in-band messages to the egress MPOA client over the connection in order to designate the connection for a number of Virtual Private Networks, and multiplexes packets from the number of Virtual Private Networks over the connection.

The present invention may also be embodied as a method for supporting multiple VPNs using the Next Hop Resolution Protocol (NHRP), which involves determining a Virtual Private Network for each NHRP message and encoding a Virtual Private Network identifier in each NHRP message. Encoding the VPN identifier in each NHRP message may involve including the Virtual Private Network identifier in a header (such as an LLC/SNAP header), or associating each Virtual Private Network with a unique tag and including in each packet the unique tag corresponding to the Virtual Private Network.

The present invention may be embodied in other specific forms without departing from the essence or essential characteristics. The described embodiments are to be considered in all respects only as illustrative and not restrictive.

It should be noted that the term "packet" is used herein as a generic term for a unit of information that is processed in accordance with a particular communication protocol, and should not be construed to limit application of the present invention to a specific information format or communication protocol. Thus, a packet may be any unit of information for use with any protocol including, but not limited to, a frame, a packet, a datagram, a user datagram, or a cell.

We claim:

1. A method for supporting multiple Virtual Private Networks in a Multi-Protocol Over ATM/Next Hop Resolution Protocol (MPOA/NHRP) communication system, the method comprising:

establishing a connection in the communication system;
using in-band signaling to designate the connection for a number of Virtual Private Networks; and
multiplexing packets from the multiple Virtual Private Networks over the connection.

2. The method of claim 1, wherein the act of using in-band signaling to designate the connection for a number of Virtual Private Networks comprises:

using in-band signaling to add a Virtual Private Network to the connection.

3. The method of claim 1, wherein the act of using in-band signaling to designate the connection for a number of Virtual Private Networks comprises:

using in-band signaling to remove a Virtual Private Network from the connection.

4. The method of claim 1, wherein the act of multiplexing packets from the multiple Virtual Private Networks over the connection comprises:

encoding a Virtual Private Network identifier in each packet.

5. The method of claim 4, wherein the act of encoding a Virtual Private Network identifier in each packet comprises:

associating a unique tag with each of the multiple Virtual Private Networks;
determining the Virtual Private Network for a packet; and
including the corresponding tag in the packet.

6. The method of claim 4, wherein the act of encoding a Virtual Private Network identifier in each packet comprises:

including the Virtual Private Network identifier in the packet.

7. The method of claim 6, wherein the act of including the Virtual Private Network identifier in the packet comprises:

including the Virtual Private Network identifier in a header within the packet.

8. The method of claim 7, wherein the header comprises a Logical Link Control/SubNetwork Attachment Point (LLC/SNAP) header.

9. An apparatus for supporting multiple Virtual Private Networks in a Multi-Protocol Over ATM/Next Hop Resolution Protocol (MPOA/NHRP) communication system, the apparatus comprising:

connection establishment logic operably coupled to establish a connection over the MPOA/NHRP communication system;
in-band signaling logic operably coupled to use in-band signals to designate the connection for a number of Virtual Private Networks; and
multiplexing logic operably coupled to multiplex packets from the number of Virtual Private Networks over the connection.

10. The apparatus of claim 9, wherein the in-band signaling logic is operably coupled to send an in-band signal including a Virtual Private Network identifier identifying a Virtual Private Network to be added to the connection.

11. The apparatus of claim 9, wherein the in-band signaling logic is operably coupled to send an in-band signal including a Virtual Private Network identifier identifying a Virtual Private Network to be removed from the connection.

12. The apparatus of claim 9, wherein the multiplexing logic is operably coupled to encode a Virtual Private Network identifier in each packet.

13. The apparatus of claim 12, further comprising a database mapping each Virtual Private Network to a unique tag corresponding to the Virtual Private Network.

14. The apparatus of claim 13, wherein the multiplexing logic is operably coupled to receive a packet associated with a Virtual Private Network, retrieve the tag corresponding to the Virtual Private Network from the database, and insert the tag into the packet.

15. The apparatus of claim 12, wherein the multiplexing logic is operably coupled to include the Virtual Private Network identifier in each packet.

16. The apparatus of claim 15, wherein the multiplexing logic is operably coupled to include the Virtual Private Network identifier in a header within each packet.

17. The apparatus of claim 16, wherein the header comprises a Logical Link Control/SubNetwork Attachment Point (LLC/SNAP) header.

18. The apparatus of claim 9, wherein the in-band signaling logic is operably coupled to receive an in-band signal including a Virtual Private Network identifier identifying a Virtual Private Network to be added to the connection.

19. The apparatus of claim 9, wherein the in-band signaling logic is operably coupled to receive an in-band signal including a Virtual Private Network identifier identifying a Virtual Private Network to be removed from the connection.

20. The apparatus of claim 9, wherein the multiplexing logic is operably coupled to receive the packets over the connection and determine a Virtual Private Network for each packet.

21. The apparatus of claim 20, wherein the multiplexing logic is operably coupled to determine the Virtual Private Network for each packet based upon inherent information within each packet.

22. The apparatus of claim 20, wherein the multiplexing logic is operably coupled to determine the Virtual Private Network for each packet based upon a Virtual Private Network identifier encoded in each packet.

23. The apparatus of claim 22, further comprising a database mapping each of a plurality of tags to a corresponding Virtual Private Network identifier.

24. The apparatus of claim 23, wherein each packet includes a tag, and wherein the multiplexing logic is operably coupled to retrieve the Virtual Private Network identifier from the database based upon the tag.

25. The apparatus of claim 22, wherein each packet includes a Virtual Private Network identifier, and wherein the multiplexing logic is operably coupled to extract the Virtual Private Network identifier from the packet.

26. The apparatus of claim 25, wherein the Virtual Private Network identifier is included in a header within each packet.

27. The apparatus of claim 26, wherein the header comprises a Logical Link Control/SubNetwork Attachment Point (LLC/SNAP) header.

28. A computer program product comprising a computer readable medium having embodied therein a computer program for supporting multiple Virtual Private Networks in a Multi-Protocol Over ATM/Next Hop Resolution Protocol (MPOA/NHRP) communication system, the computer program comprising:

connection establishment logic programmed to establish a connection over the MPOA/NHRP communication system;

in-band signaling logic programmed to use in-band signals to designate the connection for a number of Virtual Private Networks; and multiplexing logic programmed to multiplex packets from the number of Virtual Private Networks over the connection.

29. The computer program product of claim 28, wherein the in-band signaling logic is programmed to send an in-band signal including a Virtual Private Network identifier identifying a Virtual Private Network to be added to the connection.

30. The computer program product of claim 28, wherein the in-band signaling logic is programmed to send an in-band signal including a Virtual Private Network identifier identifying a Virtual Private Network to be removed from the connection.

31. The computer program product of claim 28, wherein the multiplexing logic is programmed to encode a Virtual Private Network identifier in each packet.

32. The computer program product of claim 31, wherein the multiplexing logic is operably coupled to a database mapping each Virtual Private Network to a unique tag corresponding to the Virtual Private Network.

33. The computer program product of claim 32, wherein the multiplexing logic is programmed to receive a packet associated with a Virtual Private Network, retrieve the tag corresponding to the Virtual Private Network from the database, and insert the tag into the packet.

34. The computer program product of claim 31, wherein the multiplexing logic is programmed to include the Virtual Private Network identifier in each packet.

35. The computer program product of claim 34, wherein the multiplexing logic is programmed to include the Virtual Private Network identifier in a header within each packet.

36. The computer program product of claim 35, wherein the header comprises a Logical Link Control/SubNetwork Attachment Point (LLC/SNAP) header.

37. The computer program product of claim 28, wherein the in-band signaling logic is programmed to receive an in-band signal including a Virtual Private Network identifier identifying a Virtual Private Network to be added to the connection.

38. The computer program product of claim 28, wherein the in-band signaling logic is programmed to receive an in-band signal including a Virtual Private Network identifier identifying a Virtual Private Network to be removed from the connection.

39. The computer program product of claim 28, wherein the multiplexing logic is programmed to receive the packets over the connection and determine a Virtual Private Network for each packet.

40. The computer program product of claim 39, wherein the multiplexing logic is programmed to determine the Virtual Private Network for each packet based upon inherent information within each packet.

41. The computer program product of claim 39, wherein the multiplexing logic is programmed to determine the Virtual Private Network for each packet based upon a Virtual Private Network identifier encoded in each packet.

42. The computer program product of claim 41, wherein the multiplexing logic is operably coupled to a database mapping each of a plurality of tags to a corresponding Virtual Private Network identifier.

43. The computer program product of claim 42, wherein each packet includes a tag, and wherein the multiplexing logic is programmed to retrieve the Virtual Private Network identifier from the database based upon the tag.

44. The computer program product of claim 41, wherein each packet includes a Virtual Private Network identifier, and wherein the multiplexing logic is programmed to extract the Virtual Private Network identifier from the packet.

45. The computer program product of claim 44, wherein the Virtual Private Network identifier is included in a header within each packet.

46. The computer program product of claim 35, wherein the header comprises a Logical Link Control/SubNetwork Attachment Point (LLC/SNAP) header.

47. A communication system for supporting multiple Virtual Private Networks, the communication system comprising an ingress Multi-Protocol Over ATM (MPOA) client in communication with an egress MPOA client over a Multi-Protocol Over ATM/Next Hop Resolution Protocol (MPOA/NHRP) network, wherein the ingress MPOA client establishes a connection to the egress MPOA client over the MPOA/NHRP network, sends in-band messages to the egress MPOA client over the connection in order to designate the connection for a number of Virtual Private Networks, and multiplexes packets from the number of Virtual Private Networks over the connection.

48. A method for supporting multiple Virtual Private Networks using the Next Hop Resolution Protocol (NHRP), the method comprising:

determining a Virtual Private Network for each NHRP message;

encoding a Virtual Private Network identifier in each NHRP message;

wherein the act of encoding the Virtual Private Network identifier in each NHRP message comprises:

associating each Virtual Private Network with a unique tag; and including in each packet the unique tag corresponding to the Virtual Private Network.

49. The method of claim 48, wherein the act of encoding the Virtual Private Network identifier in each NHRP message comprises including the Virtual Private Network identifier in a header within each packet.

50. The method of claim 49, wherein the header is a Logical Link Control/SubNetwork Attachment Point (LLC/SNAP) header.

* * * * *